Jan. 16, 1968  R. M. GERLITZ  3,363,819
SOLDERING MACHINES
Filed Oct. 20, 1965
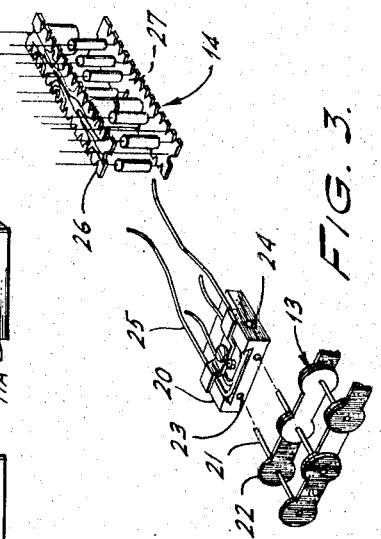
FIG. 2.
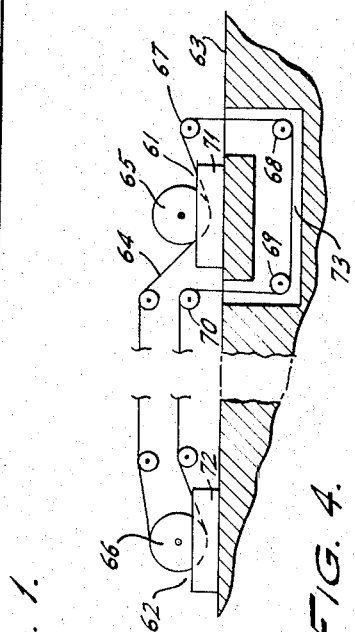
FIG. 3.
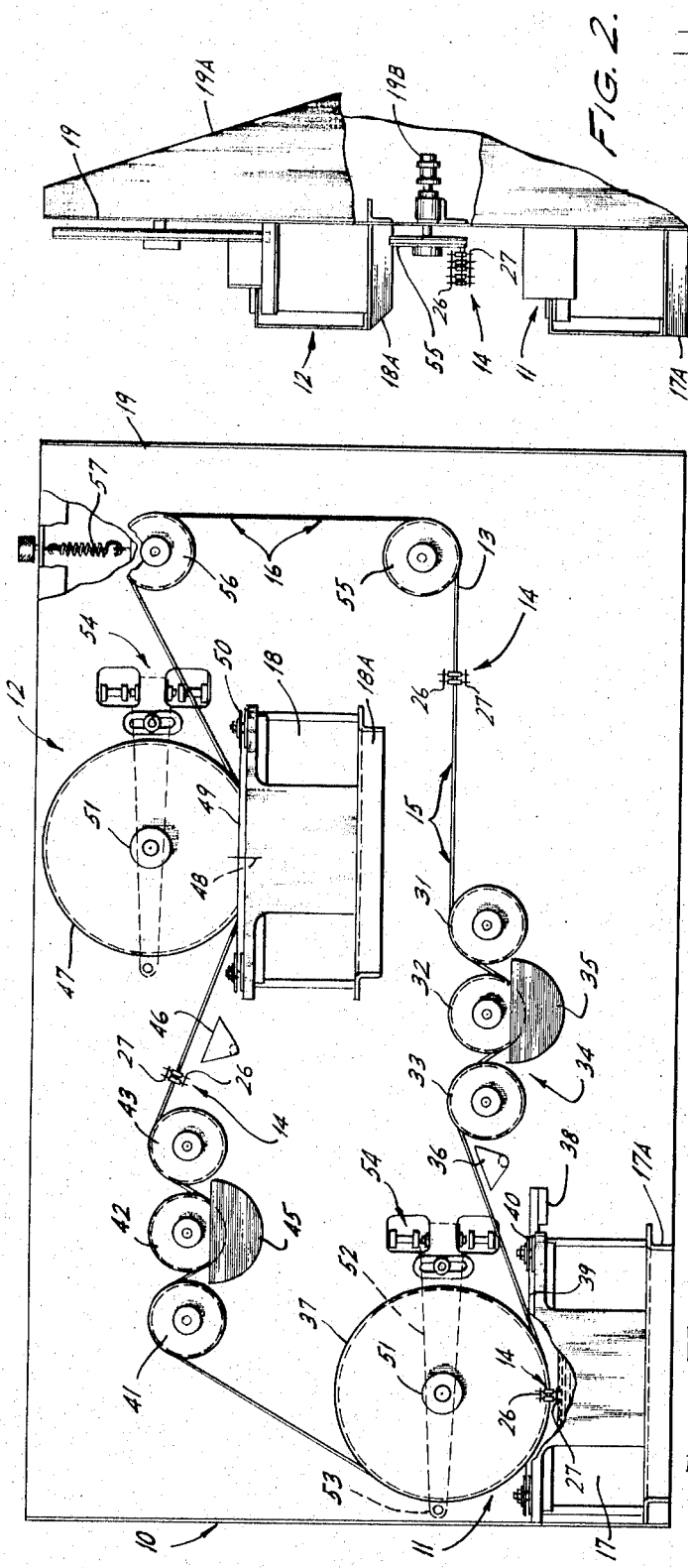
FIG. 1.
FIG. 4.
INVENTOR.
RICHARD M. GERLITZ
BY
Franz D. Prager
ATTORNEY

United States Patent Office 3,363,819
Patented Jan. 16, 1968

3,363,819
SOLDERING MACHINES
Richard M. Gerlitz, Blue Bell, Pa., assignor to Philco-Ford Corporation, Philadelphia, Pa., a corporation of Delaware
Filed Oct. 20, 1965, Ser. No. 498,603
10 Claims. (Cl. 228—36)

This invention relates to the soldering of electronic circuit units or so-called modules. It provides a soldering machine and, in particular, a machine for dip-soldering a plurality of surface areas on "cordwood" modules.

Such a module comprises a pair of small circuit boards, one facing the other, and electronic components between these boards. The machine dip-solders the lead wires of components to circuits on oppositely facing surfaces of the two boards.

Large numbers of modules are produced, and it is important to provide for rapid, mechanized soldering in order to expedite such production. Massive equipment is needed for operations of the indicated kind, as a substantial supply of liquid solder—a hot and heavy liquid—must be maintained for soldering the numerous modules.

Heretofore it was usual to mount the solder tank on a strong and solid foundation and to install auxiliary equipment, including a conveyor for moving the modules, above the exposed surface of the solder. This usual arrangement provided a simple and safe mounting structure for the soldering equipment, but was conducive to high operating costs. Although the conveyors and module holders were inexpensive, as is of course desired, the operation of this usual arrangement was expensive. In order to keep all conveyor parts above the solder tanks and yet to solder different module portions, it was necessary to resort to a cycle of operations which included the steps of loading each module on the conveyor, soldering one surface area of the module, unloading of the module, inverted reloading thereof, renewed soldering, and final unloading of the module. In such a cycle, which was needed whenever modules were to be soldered on more than one side, the sequence of first loading . . . , unloading . . . , and inverted reloading of modules tended to be time consuming and costly. It is an object and feature of my invention to make this complex sequence of steps unnecessary and to render the dip-soldering of cordwood modules and the like correspondingly cheaper and faster, by a new arrangement of soldering means.

Toward this objective the invention provides a plurality and particularly a pair of solder units, interconnected and supplied with modules by a conveyor or chain belt in a new and novel way. At least one of the solder units, in a preferred embodiment of the new machine, has its solder tank inside a closed loop of the conveyor chain, and above a lower run of this chain. One of the solder units has a solder tank in the usual position outside said closed loop and below the same. The modules to be soldered in the new machine are advantageously attached to individual links of the conveyor chain by rigid but removable fastening means. By virtue of the new arrangement the machine operates sequentially to solder different sides of each module, in the different solder tanks.

A preferred embodiment of the invention is illustrated in the drawing, wherein FIGURE 1 is a side view of the machine, FIGURE 2 is an end view thereof, and FIGURE 3 is an enlarged perspective view of a module and of a fastener for securing the same to the machine's transport chain. FIGURE 4 is a diagrammatic side view showing a modified machine, on a greatly reduced scale.

As shown in FIGURE 1, machine 10 comprises a pair of soldering units 11, 12. A conveyor chain 13 driven by a suitable motor, not shown, carries modules 14 from loading area 15 through the two units, and to unloading area 16. The conveyor chain then again passes through these areas; it forms a closed loop. FIGURE 1 shows fewer modules, and shows them larger in comparison with other elements, than they actually are in typical embodiments of the invention. This showing is presented in order to indicate the positioning of the modules, relative to other elements, as clearly as possible.

According to the invention the first soldering unit 11, as shown, has solder pot 17 positioned on the outside of the chain loop transporting the modules, whereas the second soldering unit 12 has solder pot 18 positioned on the inside of said chain loop. Differently expressed, conveyor chain 13 has a first soldering run above pot 17, wherein it downwardly presents a first module surface 27, shown here as the lower one in contact with the surface of the pool of solder. Conveyor chain 13 also has a second and inverted soldering run, above pot 18, wherein it downwardly and in lower position presents the opposite module surface 26 for soldering (shown above pot 17 as an upper one).

The two solder pots and their associated equipment are firmly mounted on the front surface of a vertical panel 19 which preferably is reinforced by strong bracing structure 19A, FIGURE 2. For such mounting, rigid brackets 17A, 18A are secured to structure 19A, supporting solder pots 17, 18 respectively. The panel and bracing structure also supports required bearing and drive means, one of which appears at 19B, for the conveyor sprockets.

Cordwood module 14, to be soldered by the machine, is most clearly shown in FIGURE 3. It comprises a pair of circuit boards 26, 27, one facing the other, and a system of components and wires transverse to said boards. The wires are to be dip-soldered to circuits carried by said boards.

For such soldering the module is firmly but removably mounted on a small holder block 20, and the holder block in turn is rigidly secured to the chain by a pair of pins 21, horizontally extending from a chain link 22 and inserted into corresponding apertures 23 in the block, where a fastener 24 secures such a pin. Holder block 20 supports module 14 by a system of resilient arms 25, desirably made of spring wire and suitably coated to protect the components. As the modules usually are small and of light weight, they and their holders can simply cantilever from the side of conveyor chain 13 by means of the pins supporting them, without undue distortion of the chain. Each module is engaged by the spring arms of a holder in such way that one of the outer module board surfaces, 26, is exposed toward the inside of the chain loop, while a second outer surface, 27, is exposed toward the outside of this loop.

The module, on its holder and chain link, enters the first soldering unit 11, FIGURE 1, for soldering component wires to this outer surface 27. Conveniently, the module passes over first, second and third guide wheels or sprockets 31, 32, 33 of a fluxing system 34, forming part of this unit and which includes flux tank 35. The flux tank is disposed below middle sprocket 32 and is kept filled with liquid soldering flux by means of inlet and control means, not shown, to such a level that each module has only its outwardly exposed surface 27 immersed in the liquid flux while the corresponding chain link passes around sprocket 32. Subsequently a conventional air manifold or nozzle 36, supplied with compressed heated air by means not shown, may be used to dry flux on the module.

The module is then dip-soldered as the corresponding chain link passes over a relatively large wheel or sprocket gear 37, disposed at and above the solder level in pot 17, as shown in a partially broken-away portion of FIGURE 1. Thereafter the chain carries the module into the second soldering unit 12, which comprises a fluxing and hot air drying assembly 41 to 46, and sprocket 47 above solder pot 18. This unit is generally similar to the assembly of elements 31 to 37 in unit 11; however, in accordance with the invention the orientation of chain 13 and module 14 is not the same with respect to the two solder pots. While the first unit 11 has pot 17 outside and wheel 37 inside the chain loop, the opposite arrangement is used in the second unit 12, which accordingly has soldering wheel 47 outside the loop. Similarly the first flux tank 35 is outside the loop while the second flux tank 45 is inside. By means of this very simple arrangement, it is provided that outer module surfaces 26 are treated in dip-solder unit 11, whereas inner module surfaces 27 are similarly treated in unit 12, and this is done without intermediate unloading, reversing, and reloading of modules.

Advantageously a predetermined solder level is maintained in solder tank 17, by well known solder supplying and melting means, not shown. In addition it is preferred to keep the solder surface clear of oxidized material or dross, by known skimmer means 38. The skimmer can be suitably pivoted to a chain 39 which runs over sprockets 40 at the top of the solder tank and is driven by conventional drive means, not shown. Similar dross skimming means 48 to 50 are provided on solder tank 18.

Each soldering wheel 37, 47 is shown as having a hub 51 rotatably held on an arm 52 swingable about a pivot 53 to adjust the immersion and soldering of the traveling modules. Precision adjustment means 54 are provided for this purpose. In order to prevent the adjustment of a soldering wheel from undesirably stretching or loosening the conveyor chain, this chain advantageously runs over a series of idlers 55, 56, etc., at least one of which is adjustably and resiliently suspended, as at 57.

In operation, both solder tanks 17, 18 are filled with solder which is heated and skimmed to present a clear solder liquid surface, and conveyor chain 13 is caused to travel, for instance at a speed of up to about fifteen feet per minute. Modules are attached to the traveling conveyor chain, in loading area 15, for instance at the rate of about five modules per foot of chain, that is, about seventy-five modules per minute. These specific rates of course are mentioned only for purposes of illustration.

When a module 14 has been attached to chain 13, in loading zone 15, the chain carries this module through fluxing system 34 of the first soldering unit 11, where outer module surface 27 is fluxed; then, after drying of flux at 36, this outer module surface is solder-dipped in pot 17 as module 14 passes around soldering wheel 37. Next, the other surface 26 of this module 14 is fluxed and dip-soldered in the second unit 12, and by means of the novel arrangement of the chain loop, relative to the soldering apparatus, no reloading or reversal of the module, relative to its supporting chain link, is needed for this purpose. The module is then removed from the chain, in unloading area 16, while chain 13 continues to pass through loading area 15 and to be loaded with new modules, which it similarly carries through the several solder units.

By contrast to this simple and inexpensive operation, it was necessary in former soldering machines and systems to perform separate module loading, unloading and reloading operations, either manually or otherwise, in order to achieve soldering of more than one surface on a cordwood module. The invention has made it possible to substantially reduce the time and effort expended on the complete program of module loading, soldering and unloading operations. It has achieved this saving and simplification by the new and unusual arrangement of several solder units, differently mounted relative to a single module conveyor chain, as has been described herein.

It will be noted that the second solder unit 12, as shown in FIGURES 1 and 2, is mounted on panel and bracket structure 18A, 19 in rather unconventional, elevated position, with a lower run of the conveyor chain running below its solder tank. While such mounting of the solder unit, complete with its heavy solder tank and the massive equipment thereof, requires strong and rigid support structure, the cost of this structure is well justified by the substantial savings, obtained by the new operating cycle which comprises a single loading operation, a pair of soldering operations, and a single unloading operation.

Various modifications of the described arrangement are possible within the scope of this invention. For instance FIGURE 4 indicates the general arrangement of a soldering system wherein solder units 61, 62 are mounted directly on a flat and rigid foundation or floor 63, while conveyor chain 64 is suitably trained over and under the component parts of the system by soldering wheels 65, 66 and auxiliary sprockets 67, 68, 69, 70, etc. In accordance with the invention it is still necessary to mount one of the solder tanks, 71, inside the chain loop while mounting the other tank 72 outside the same. Accordingly a lower run of conveyor chain 64, here indicated as extending between sprockets 68 and 69, runs below the inner solder tank 71 and below the mounting surface 63 of the same. This modified arrangement uses a duct 73 formed in rigid base 63 and wherein sprockets 68 and 69 are mounted.

In both systems, FIGURES 1 and 4, the chain loop advantageously lies in a vertical plane, while the solder surfaces of course are horizontal. By means of the described arrangement, opposite surfaces 26, 27 of cordwood modules, secured to the chain links (FIGURE 3) and traveling with the same, can be kept horizontal while they are dipped into the successive solder tanks, disposed inside and outside the chain loop (FIGURES 1, 4).

While only two embodiments of the invention have been described, the details thereof are not to be construed as limitative of the invention. The invention contemplates such variations and modifications as come within the scope of the appended claims.

I claim:

1. In a machine for soldering opposite surface portions of a series of electronic circuit-carrying devices moving along a loop, at least one solder tank disposed inside the loop for soldering a first surface portion of each device, and at least one solder tank disposed outside the loop for soldering an opposite surface portion of each device.

2. A machine for applying solder to opposite surfaces of cordwood modules and the like, said machine comprising an endless conveyor which has means for securing the modules thereto, the conveyor having a first soldering run wherein it downwardly presents a first surface of each module secured thereto, and a second soldering run wherein it downwardly presents a second surface of each such module; and means for soldering the different surfaces of the so secured modules, including a solder pot below the first soldering run for contacting the first module surface with solder, and an additional solder pot below the second soldering run for contacting the second module surface with solder.

3. A machine as described in claim 2 wherein the several soldering runs are disposed at different levels in a substantially vertical plane.

4. A machine as described in claim 2, additionally including a rigid, upright panel structure and means for mounting said solder pots on said panel structure at different elevations thereof.

5. A machine for applying solder to different surfaces of circuit modules and the like, said machine comprising an endless conveyor which forms a closed loop; means for securing the modules to said conveyor; and, for contacting the different surfaces of the so secured modules with solder, at least one solder pot disposed within said loop and an additional solder pot disposed below said loop.

6. A machine as described in claim 5, additionally including a flux tank within said loop and ahead of said one solder pot, and a flux tank below said loop and ahead of the other solder pot.

7. A machine as described in claim 5, also including a single station for loading modules onto the conveyor and a single station for unloading modules from the conveyor, at least one of said stations being disposed in a run of said conveyor between said solder pots.

8. A machine as described in claim 5 wherein the means for securing modules to the conveyor comprises a series of small blocks distributed along the conveyor and individually secured to the same, and resilient arms on each block for holding a module.

9. Apparatus for holding a module to a conveyor chain for applying solder to opposite surfaces of the module, said apparatus comprising a holder structure; means for firmly attaching the holder structure to a link of the chain; and means for firmly but removably attaching a module to the block for travel with the chain in such a way that the chain, when traveling in a closed loop lying in a vertical plane, successively presents a first surface and an opposite surface of the attached module to soldering regions below said link.

10. Apparatus as described in claim 9 wherein said means for attaching the holder structure comprises a rigid block and said means for attaching a module comprises resilient arms extending from said block, laterally of the chain, to clamp the module to the chain.

References Cited

UNITED STATES PATENTS 2,935,962   5/1960   Deitrick et al. _____ 118—423

RICHARD H. EANES, JR., *Primary Examiner.*